US009374381B2

(12) United States Patent
Kim et al.

(10) Patent No.: US 9,374,381 B2
(45) Date of Patent: Jun. 21, 2016

(54) SYSTEM AND METHOD FOR REAL-TIME MALWARE DETECTION BASED ON WEB BROWSER PLUGIN

(71) Applicant: Electronics and Telecommunications Research Institute, Daejeon (KR)

(72) Inventors: Jung Tae Kim, Daejeon (KR); Min Ho Han, Daejeon (KR); Jong Hoon Lee, Daejeon (KR); Ik Kyun Kim, Daejeon (KR); Hyun Sook Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 91 days.

(21) Appl. No.: 14/249,811

(22) Filed: Apr. 10, 2014

(65) Prior Publication Data
US 2015/0188936 A1    Jul. 2, 2015

(30) Foreign Application Priority Data
Dec. 26, 2013  (KR) .................. 10-2013-0163612

(51) Int. Cl.
*G06F 11/00* (2006.01)
*G08B 23/00* (2006.01)
*H04L 29/06* (2006.01)
*H04L 29/08* (2006.01)

(52) U.S. Cl.
CPC ......... *H04L 63/1416* (2013.01); *H04L 67/2842* (2013.01)

(58) Field of Classification Search
CPC ............ H04L 63/1416; H04L 63/1408; H04L 63/1441; H04L 63/1458; G06F 21/552
USPC ................. 713/153–154, 187–188, 193–194; 726/1, 13, 22–33; 709/206, 249, 389
See application file for complete search history.

(56) References Cited

U.S. PATENT DOCUMENTS

| 6,279,113 | B1 * | 8/2001 | Vaidya | ................ H04L 63/1416 709/229 |
| 2004/0148281 | A1 * | 7/2004 | Bates | ..................... G06F 21/562 |
| 2012/0278886 | A1 * | 11/2012 | Luna | ..................... G06F 21/552 726/22 |

FOREIGN PATENT DOCUMENTS

KR    100577829 B1    5/2006

* cited by examiner

*Primary Examiner* — Evans Desrosiers
(74) *Attorney, Agent, or Firm* — Rabin & Berdo, P.C.

(57) ABSTRACT

According to a method and system for real-time malware detection based on web browser plugin, the method and system may connect a web server of a web site through a web browser module, execute a security module through a browser plugin of the web site, update a database for a browser cache of the web site from the web server by the security module, cache a web content of the web site from the web server, match cache data of the web content with the database, and warn about the web content if data matched with the cache data of the web content does not exist in the database.

9 Claims, 5 Drawing Sheets

| ID | File Name | Type | Time | Size | Author | IP | Sign |
|---|---|---|---|---|---|---|---|
| Site_001 | Patent.pdf | Document | 2013-10-31 16:00:10 | 223,712 | Admin | 10.0.0.1 | @#FGD$ |
| Site_001 | Music.mp3 | Audio | 2013-10-31 17:00:10 | 5,223,712 | Whistler | 10.0.0.1 | !asd#@ |
| Site_002 | App.exe | Application | 2013-10-31 18:00:10 | 3,223,712 | Kim | 10.0.1.2 | sfd%=$ |

SYSTEM AND METHOD FOR REAL-TIME MALWARE DETECTION BASED ON WEB BROWSER PLUGIN

CROSS-REFERENCE TO RELATED APPLICATION

The priority of Korean patent application No. 10-2013-0163612 filed Dec. 26, 2013, the disclosure of which is hereby incorporated in its entirety by reference, is claimed.

BACKGROUND OF THE INVENTION

1. Field of the Invention

The present invention relates a system and method for real-time malware detection based on web browser plugin.

2. Background of the Invention

Recently, intelligent cyber attacks (APT, Advanced Persistent Threat) distribute a malware through an E-mail, a web article or other script etc. using the vulnerability of a system or application, or carry out application level attacks such as stealing identification information or confidential data of individuals and companies through the process of a malicious web redirect (Web Redirects).

FIG. 1 is a diagram showing an example of an intelligent cyber attack. Referring to FIG. 1, a network system, which a plurality of host devices 10 and network connection devices (router 20) are connected through wired and wireless networks, is shown.

FIG. 1 shows the case which an attacker 30 carry out a cyber attack through an intermediate host (attack system 40). That is, it shows the case which the position of an attack system 40 is different from the position of the attacker 30 attempting to hack actually. In FIG. 1, although the attacker 30 is via one attack system 40, the attacker 30 may be via multiple other systems.

In a security system which a tracking module is installed on the position capable of monitoring network packets or communication connections are monitored in order to detect malware, when the attacker 30 is via a network equipment such as a router 20 or an Internet Service Provider (ISP), it is impossible to track the actual location of the attacker 30 which is via multiple systems.

In particular, in intelligent cyber attacks, data is transmitted to and received from intermediate hosts in an application level. If the attack is through a connection chain, it is impossible to track it in a network layer. In recent years, mobile based cyber attacks also increase.

In addition, in the recent case of the intelligent cyber attacks, it is exhaustively prepared and planned over a long period, and it continuously attacks a certain target for the specific purpose. Victims are not aware of the infection, and also it is difficult to detect by existing security tools.

Accordingly, the method, which detects the above intelligent cyber attacks at an application level in real time and an effective security is possible, is required.

BRIEF SUMMARY OF THE INVENTION

The technical subject which at least one embodiment of the present invention try to achieve is to provide a system and method for real-time malware detection based on web browser plugin. Also, it is to provide a computer readable storage medium storing a program for executing the above method in a computer. The technical subjects that various embodiments of the present invention try to achieve are not limited to the above technical subjects, another technical subjects may exist.

To achieve the above technical subject, a method for real-time malware detection based on web browser plugin according to an embodiment may comprise steps of: connecting a web server of a web site through a web browser module; executing a security module through a browser plugin of the web site; updating a database for a browser cache of the web site from the web server by the security module; caching a web content of the web site from the web server; matching cache data of the web content with the database; and warning about the web content if data matched with the cache data of the web content does not exist in the database.

According to an embodiment, the method may further comprise steps of querying to a user whether to block the web content; and allowing or blocking the web content based on the user's response.

According to another embodiment, the method may further comprise steps of installing the security module through the browser plugin of the web site if the security module for the web site is not installed on a host device; and downloading the database from the web server by the security module.

The database may include a file name, a file type, an upload time, a file size, a file author, an IP address and a signature for each of web content of the web site.

The security module may match the cache data of the web content with the database, whenever an information transmission is required to the web server by a user.

The security module is installed for each web site of individual host device through the browser plugin, and each security module installed on the host device may manage database for browser cache corresponding to the web site.

An embodiment for solving another technical problem may provide a computer readable storage medium storing a program for executing the method for real-time malware detection based on web browser plugin.

An system for real-time malware detection based on web browser plugin according an embodiment for solving another technical problem may comprise: a browser module configured to connect a web server of a web site and execute a security module through a browser plugin of the web site; a cache configured to store cache data of a web content of the web site cached from the web server; a database for a browser cache of the web site configured to update from the web server by the security module; and a security module configured to match the cache data of the web content with the database and warn about the web content if data matched with the cache data of the web content does not exist.

DESCRIPTION OF EMBODIMENTS

Hereinafter, various embodiments of the present invention will be described with reference to the drawings in detail. At this time, in each of the drawings, the same components are denoted by the same reference symbols, if possible. Further, detailed descriptions for the previously known features and/or configurations are omitted. In the description below, parts required to understand operations in accordance with various embodiments will be explained in priority, the descriptions for elements, which may obscure the gist of the descriptions, are omitted.

Also, in description for the embodiment of the present invention, terms such as first, second, A, B, (a), (b), etc. may be used. These terms are for distinguishing its components with other components merely, the nature, order, or sequence and the like of the component by the term is not limited.

Figure 1:
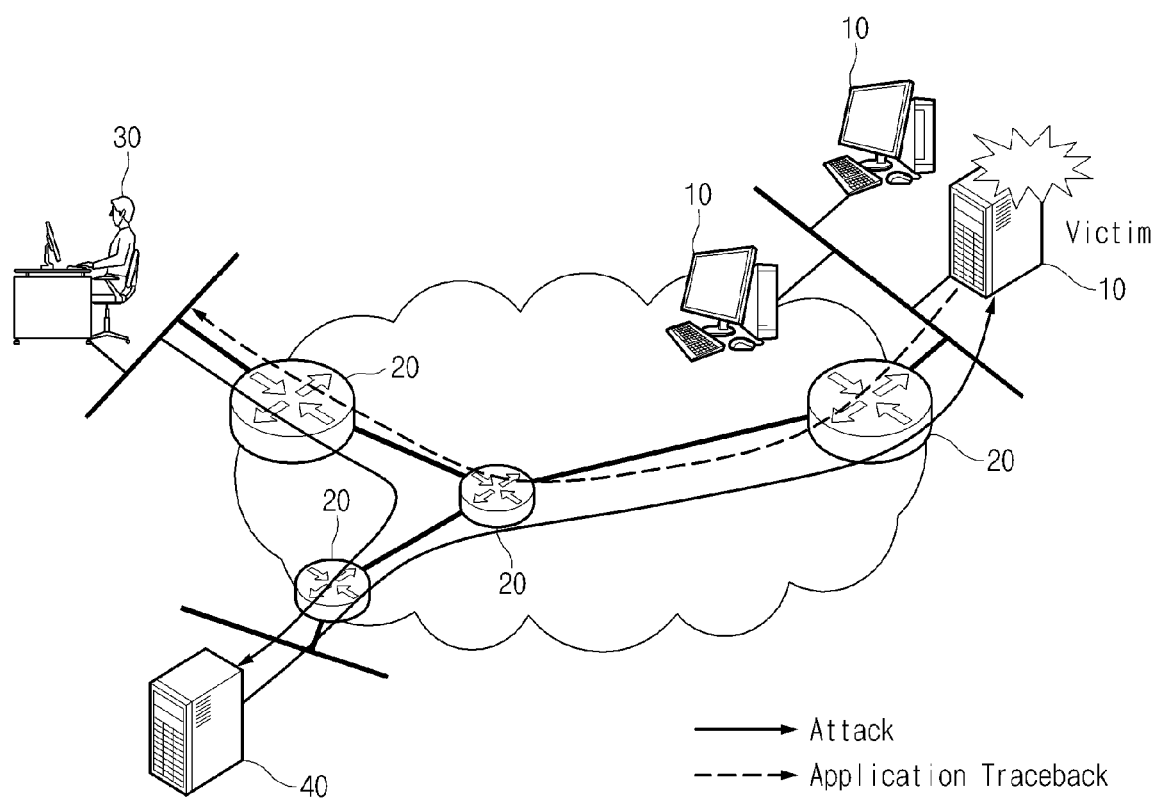
FIG. 1 is a diagram showing an example of intelligent cyber attacks.
Figures 2, 3:
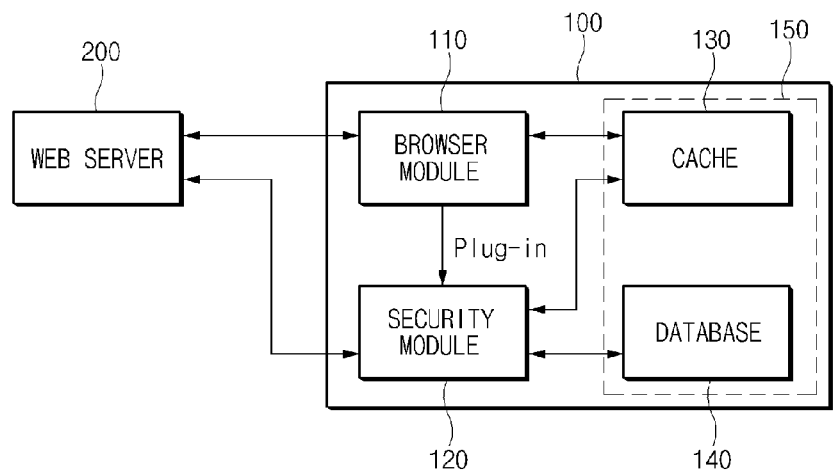
FIG. 2 is a configuration diagram of a system for real-time malware detection based on web browser plugin according to an embodiment of the present invention.
FIG. 3 is a configuration diagram of a system for real-time malware detection based on web browser plugin according to an embodiment of the present invention.

FIG. 2 is a configuration diagram of a system for real-time malware detection based on web browser plugin according to an embodiment of the present invention.

Referring to FIG. 2, the system 100 for system for real-time malware detection based on web browser plugin includes a browser module 110, a security module 120, a cache 130 and database 140. In the present specification, only related components are described in order to avoid obscuring features of the present invention. Accordingly, it will be understand by those skilled in the art that other more generic components may be included besides components illustrated in FIG. 2.

The web server 200 is the apparatus for providing web contents to the system 100 through a web site. The web server 200 receives an information transmission request from a host device, thus may provide web contents. For example, the information transmission request may be a HTTP request or a content download request and the like.

The system 100 may be driven in a state included in a host device. The host device is computer system having IP capable of two-way communication, and may include a server device, a personal computer, a cellular phone, a smart phone, a notebook computer, a digital broadcast terminal, a digital camera, a mobile game terminal, a PDA (Personal Digital Assistants), a PMP (Portable Multimedia Player), a navigation system, a tablet PC (Personal Computer) or the like. However, not limited to this, the host device may include all information communication devices, multimedia devices and their application devices capable of communicating through the web browser. Here, the network may include Internet, LAN (Local Area Network), Wireless LAN (Wireless Local Area Network), WAN (Wide Area Network), PAN (Personal Area Network), or the like.

The browser module 110 is connected to the web server 200 of the web site, and executes the security module 120 through the browser plugin of the web site. The browser module according to the present embodiment may correspond to at least one processor or be driven in the state being included in a processor.

If the security module for a predetermined site is not installed in the host device, the browser module 120 may install the security module through the browser plugin of the web site. Here, browser module 120 may install the security module for each web site of individual host device through browser plugin.

If the database 140 for the browser cache of the web site does not exist, the security module 120 may download the database 140 for the browser cache of the web site from the web server 200.

If the database 140 for the browser cache of the web site exists, the security module 120 may update the database 140 for the browser cache of the web site from the web server 200.

The security module 120 matches the cache data of the web content with the database 140. If the data matched with the cache data does not exist in the database 140, the security module 120 may warn about the web content. Not existing the data matched in the database 140 shows that the web content is suspected as a harmful content. The web content may include at least one of an execution file, an E-mail, a multimedia file, an image file or other files.

According to an embodiment, whenever an information transmission is requested to the web server 200 by a user, the security module 120 may match the cache data of the web content with the database 140.

The security module 120 queries to user whether to block the web content, and based on the user's response, may allow or block the web content.

According to one embodiment, in the matching process of matching the cache data of the web content with the database 140, the security module 120 may update a signature result of the web content in the database 140. Accordingly, the security module 120 may find the data corresponding to the cache data of the web content in the database 140, and determine whether the signature of the cache data is matched with the signature of data corresponding to the cache data. That is, the security module 120 may detect the case which the signature is different. The case which the signature is different means that the content is suspected as a harmful content. The security module 120 may determine a pass or a fail for the signature of the web content based on whether the signature is matched, and update the signature result of the web content in the database 140. Here, the signature indicates a unique identifier assigned to a file or a material.

The security module 120 according to the present embodiment may correspond to at least one processor or be driven in the state being included in a processor.

The cache 130 may store the cache data of the web content of the web site cached from the web server 200. For example, for a HTTP request, the cache data is the temporarily stored data in a host device. The cache data may include a file name, a file type, a download time, a file size, a file author, IP address and a signature and the like.

The database 140 is the database for the browser cache of the web site, and is downloaded from the web server 200 by the security module 120. Whenever an information transmission is requested to the web server 200 by a user, the database 140 may be updated from the web server 200 by the security module 120.

The database 140 may include a file name, a file type, an upload time, a file size, a file author, an IP address and a signature for each of web content of web site.

According to an embodiment, the cache 130 and the database 140 may be located in a separate storage. The memory 150 may include data or programs or the like required to drive the browser module 110 and the security module 120 besides the cache 130 and the database 140.

The memory 150 according to this embodiment may be implemented by a hard disk drive (HDD), a ROM (Read Only Memory), a RAM (Random Access Memory), a flash memory, a memory card, a NAND memory and a solid state drive (SDD), etc.

According to one embodiment, system 100 provides the information related to the web content stored in the cache 130 to the attacker tracking system, and thus it may be helpful to cause the tracking system to track the harmful program, harmful content or malware. For example, the information related to the web content may include the HTTP session or the TCP socket information or the like.

FIG. 3 is a configuration diagram of a system for real-time malware detection based on web browser plugin according to an embodiment of the present invention.

FIG. 3 shows the case which the system 100 connects to at least one web server 1, 2 . . . Z through a web browser. The browser module 110, the security module 120, the cache 130 and the database 140 shown in FIG. 3 according to the present embodiment may include description related to the browser module 110, the security module 120, the cache 130 and the database 140 shown in FIG. 2.

The browser module 110 according to the present embodiment may install the security module 120 for each web site through the browser plugin. For example, when a user connects to the web server 1 210 of the web site 1 through the browser module 110 in the host device A, the browser module 110 may install the security module 1 corresponding to the web site 1 through the browser plugin of the web site 1. The security module 1 may download the corresponding database 1 from the web server 210, and match the cache data of the web content with the database 1 whenever an information transmission is requested to the web server 1 210 by a user. Whenever the user connects to the web site 1, the security module 1 is executed through the browser plugin, and the security module 1 updates the database 1 and matches the cache data of the web content of the web site 1 with the database 1.

Similarly, when a user connects to the web server 2 220 of the web site 2 through the browser module 110, if the security module 2 is not installed on the host device A, the browser module 110 of the host device A may install the security module 2 corresponding to the web site 2 through the browser plugin of the web site 2 and download the database 2 from the web server 2 220. Whenever an information transmission is requested to the web server 2 220 by a user, the security module 2 may match the cache data of the web content with the database 2.

Thus, whenever the user connects to the security module 1, 2, . . . , Z through the browser plugin in the host device A, through installing or executing the corresponding security module, by matching the cache data of the web content of the web site with the database, the system 100 included in the host device A may provide real-time malware scan and detection.

If the user connects to the web site 1 through the host device B different from the host device A, the browser module 110 of the host device B installs the security module 1 corresponding to the web site 1 on the host device B through the browser plugin of the web site 1 and downloads the database 1 from the web server 1 210. The security module 1 installed on the host device B may match the cache data of the web content with the database 1 whenever an information transmission is requested to the web server 1 210 by a user.

Thus, the security module 120 may be installed for each web site of a separate host device through the browser plugin.

Figure 4:
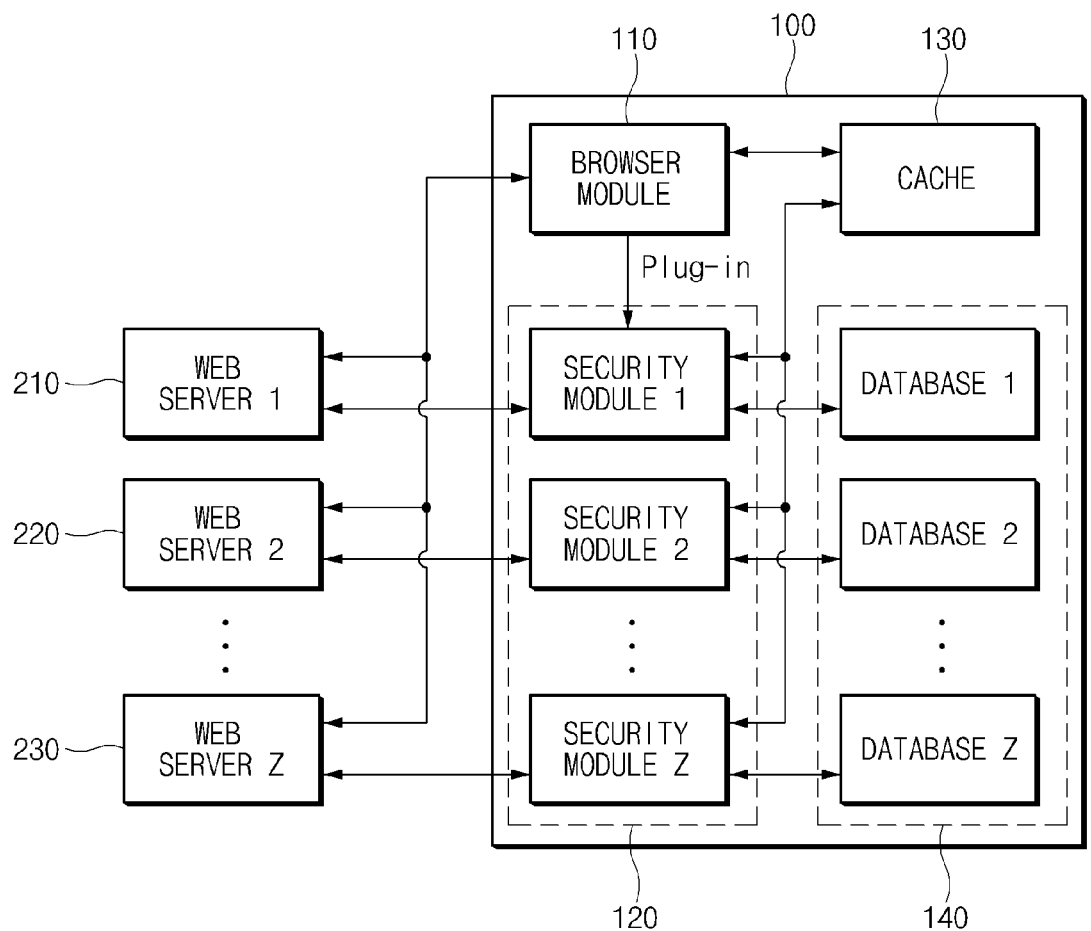
FIG. 4 is a diagram showing a database for a browser cache of a web site according to an embodiment of the present invention.

FIG. 4 is a diagram showing a database for a browser cache of a web site according to an embodiment of the present invention.

The database 140 is the database for the browser cache of the web site and is downloaded from the web server 200 by the security module 120.

Referring to FIG. 4, the database 140 is comprised of at least one of a file name, a file type, an upload time, a file size, a file author, an IP address and a signature for each of web content of the web site. The security module 120 matches the cache data of the web content of the corresponding web site with the database 140.

According to an embodiment, the security module 120 may find the data corresponding to the cache data of the web content in the database 140. The security module 120 finds data in which a file name, a file type, an upload time, a file size, a file author and an IP address of the data are same as those of the cache data. The security module 120 determines whether the signature of the cache data is matched with the signature of the corresponding data of the database 140.

For example, if a user requests named Patent.pdf file to the web server 200 on a web site, the security module 120 searches the data corresponding to the cache data of Patent.pdf stored in the cache 130 in the database 140. The security module 120 may search the file which the file name is Patent.pdf, the file type is Document, the file size is 223,712, the author is Admin, the IP address is 10.0.0.1 in the database 140. Since the data matched with the cache data of Patent.pdf exist in the database 140, the security module 120 determines whether the both signatures are matched. The security module 120 may determine the pass or the fail for the signature of the web content based on whether the signatures are matched, and update the signature result of the web content in the database 140.

If the data matched with the cache data of the web content does not exist in the database 140, the security module 120 may warn about the web content. The security module 120 queries to user whether to block the web content, and based on the user's response, may allow or block the web content.

Figure 5:
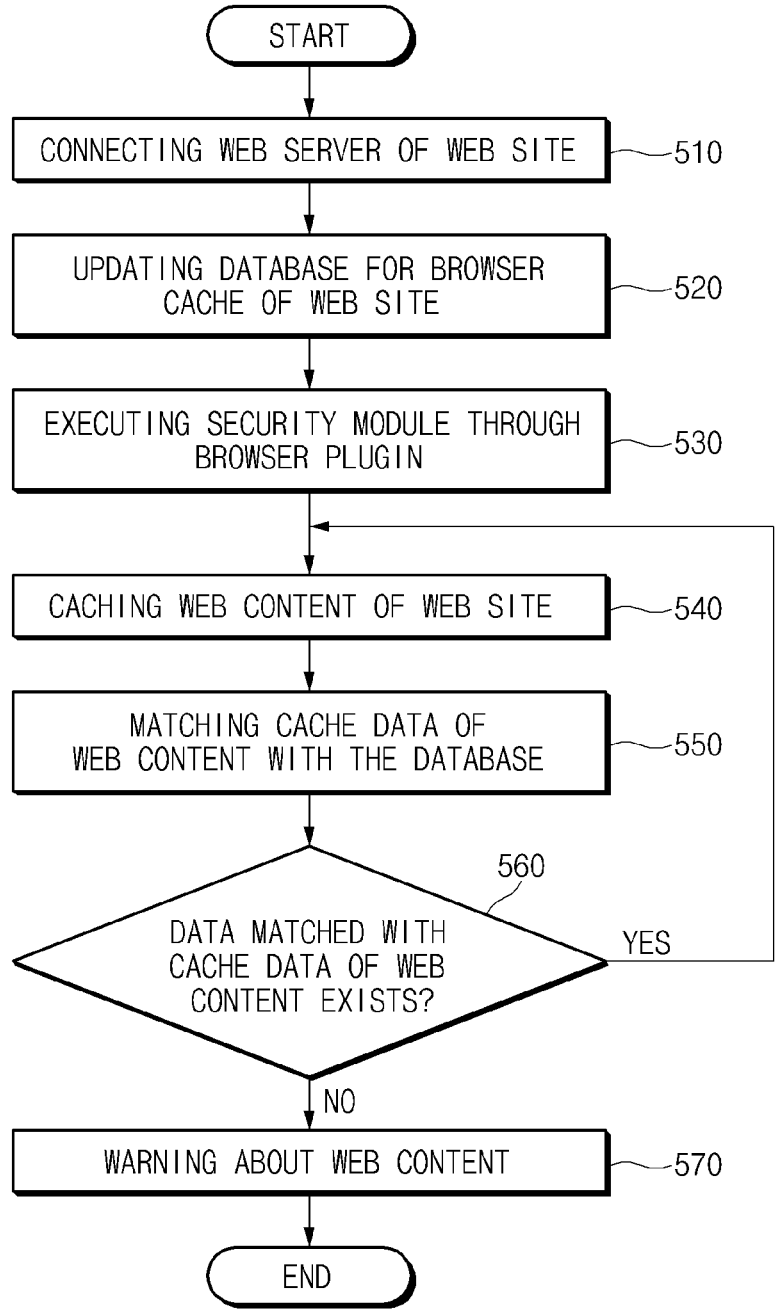
FIG. 5 is a flowchart explaining the method for real-time malware detection based on web browser plugin according to an embodiment of the present invention.

FIG. 5 is a flowchart explaining the method for real-time malware detection based on web browser plugin according to an embodiment of the present invention. The flowchart shown in FIG. 5 is comprised of the processes handled in time series in the system 10 shown in FIG. 2 through FIG. 4. Accordingly, it is understood that the above descriptions related to the system 100 shown in FIG. 2 through FIG. 4 may be applied to the flowchart shown in FIG. 5 even if it is omitted below.

In the step 510, the browser module 110 connects the web server 200 of the web site.

In the step 520, the browser module 110 executes the security module through the browser plugin. At this time, if the security module 120 of the corresponding web site is not installed, the system 100 may install the security module 120 through the browser plugin. The installed security module 120 may download the database 140 from the web server 200. Here, the security module 120 may be installed for each web site.

In the step 530, the security module 120 updates the database 140 for the browser cache of the web site.

In the step 540, the browser module 110 caches the web content of the web site from the web server 200. Thus, the cache data of the web content of the web site cached from the web server 200 may be stored in the cache 130 which is a memory space.

In the step 550, the security module 120 matches the cache data of the web content with the database. The database 140 may include a file name, a file type, an upload time, a file size, a file author, an IP address or a signature, etc. for each of web content of web site.

In the step 560, the security module 120 determines whether the data matched with the cache data of the web content exists. According to the determination result, if the data matched with the cache data of the web content does not exist in the database 140, the process proceeds to the step 570, and if the data matched with the cache data of the web content exists, the process proceeds to the step 540.

In the step 570, the security module 120 warns about the web content.

Figure 6:
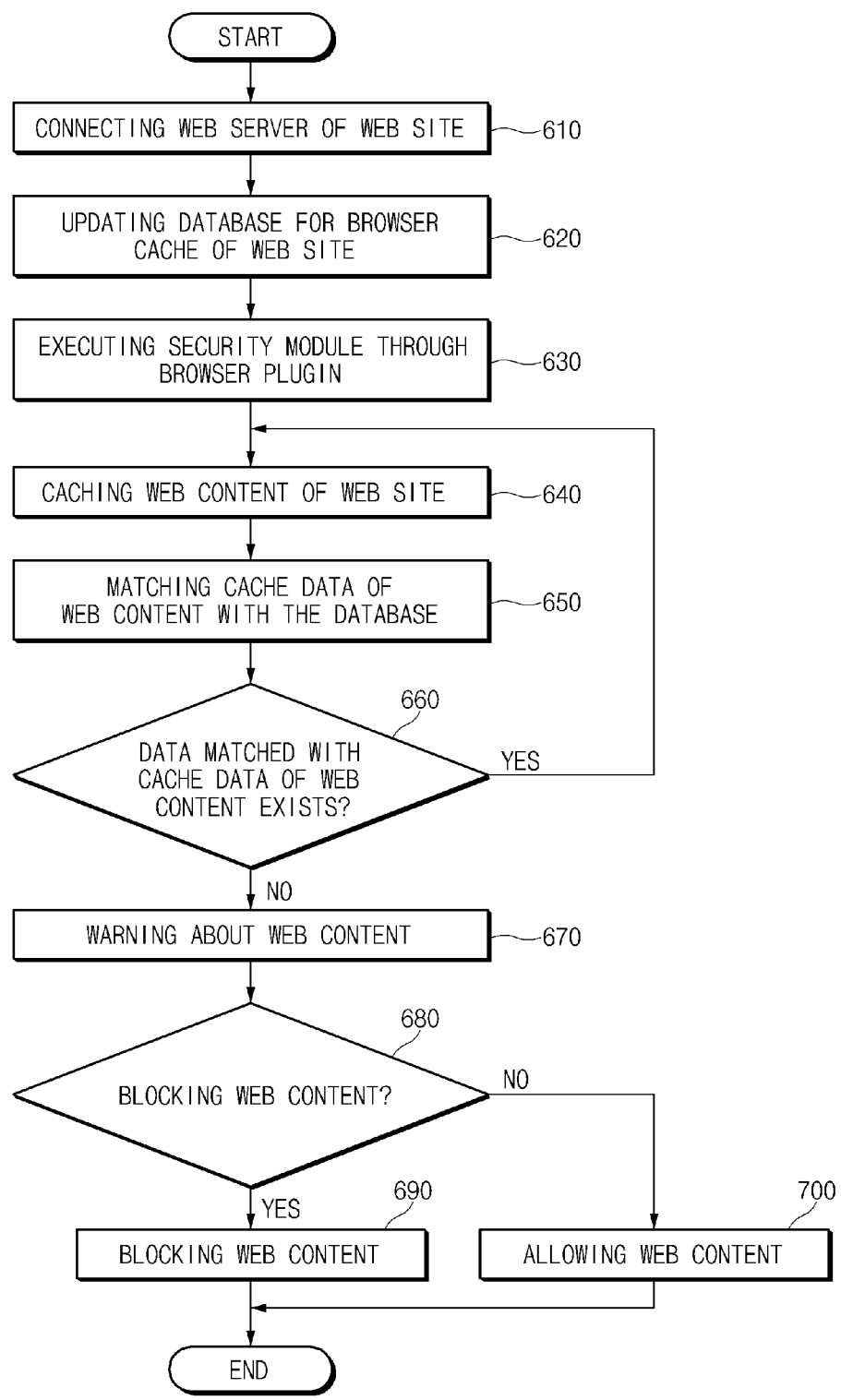
FIG. 6 is a flowchart explaining the method for real-time malware detection based on web browser plugin according to an embodiment of the present invention.

FIG. 6 is a flowchart explaining the method for real-time malware detection based on web browser plugin according to an embodiment of the present invention. The flowchart shown in FIG. 6 is comprised of the processes handled in time series in the system 10 shown in FIG. 2 through FIG. 5. Accordingly, it is understood that the above descriptions related to the system 100 shown in FIG. 2 through FIG. 5 may be applied to the flowchart shown in FIG. 6 even if it is omitted below.

In the step 610, the browser module 110 connects the web server 200 of the web site.

In the step 620, the browser module 110 executes the security module 120 through the browser plugin.

In the step 630, the security module 120 updates the database 140 for the browser cache of the web site.

In the step 640, the browser module 110 caches the web content of the web site.

In the step 650, the security module 120 matches the cache data with the database 140.

In the step 660, the security module 120 determines whether the data matched with the cache data of the web content exists. According to the determination result, if the data matched with the cache data of the web content does not exist in the database 140, the process proceeds to the step 670, and if the data matched with the cache data of the web content exists, the process proceeds to the step 640.

In the step 670, the security module 120 warns about the web content.

In the step 680, the security module 120 queries to a user whether to block the web content. According to the user's response, the security module 120 proceeds to the step 690 or the step 700.

In the step 690, the security module 120 blocks the web content. The web content stored in the cache may be deleted. Thus, download of any malware by intelligent cyber attacks and a danger of access to other site by URL falsification may be avoided by the security module 120.

In the step 700, the security module 120 allows the web content. If a user determines that the web content is not dangerous, the download or execution of the web content may be allowed.

According to a system and method for real-time malware detection based on web browser plugin of the present invention, real-time malware scan and detection may be provided. Thus, download of any malware by intelligent cyber attacks and a danger of access to other site by URL falsification may be avoided. As a result, data integrity may be provided.

Further, without a large amount of real-time monitoring of network traffic, real-time malware scan and detection is possible, thereby the overhead may be minimized.

Also, by running through a browser plugin in an individual host, it may be applied to various platform environments and heterogeneous network environments (Interoperability).

The steps of the method or algorithm explained in connection with the disclosed embodiments may be directly implemented in hardware, a software module, or the combination of both, executed by a processor. The software module may reside in a RAM memory, a flash memory, a ROM memory, an EPROM memory, an EEPROM memory, a register, a hard disk, a removable disk, a CD-ROM, or a storage medium of any other form known in the art. An exemplary storage medium is coupled to a processor, the processor may read information from the storage medium and write information in the storage medium. In the alternative, the storage medium may be integral to the processor. The processor and the storage medium may be resided in an application specific integrated circuit (ASIC). ASIC may reside in a user terminal. In the alternative, the processor and the storage medium may reside as discrete components in a user.

All embodiments and conditional examples disclosed in this specification are just for describing by way of examples thereof in order to help that ordinary skill in the art understand the principle and concept of the present invention, and it will be understood by those skilled in the art that the present invention may be implemented as various modifications with departing from the spirit of the present invention. Therefore, the disclosed embodiments must be considered not as a view of limitation but as a view of description. The scope of the present invention is recited in the appended claims, not the above descriptions, and all differences within the equivalent scope of the present invention will be construed as being included in the present invention.

What is claimed is:

1. A method for real-time malware detection based on web browser plugin, the method comprising:
   connecting a web server of a web site through a web browser module;
   installing a security module through a browser plugin of the web site if the security module for the web site is not installed on a host device;
   downloading a database for a browser cache of the web site from the web server by the security module, wherein the database includes a file name, a file type, an upload time, a file size, a file author, an IP address and a signature for each of web content of the web site;
   executing the security module through the browser plugin of the web site;
   updating the database for the browser cache of the web site from the web server by the security module;
   caching a web content of the web site from the web server;
   matching cache data of the web content with the database; and
   warning about the web content if data matched with the cache data of the web content does not exist in the database,
   wherein the security module matches the cache data of the web content with the database, whenever an information transmission is requested to the web server by a user, and
   wherein the matching of the cache data includes:
   searching data corresponding to the cache data of the web content in the database;
   determining whether a signature of the cache data is matched with a signature of the data corresponding to the cache data;
   determining a pass or fail for the signature of the web content based on whether the signature is matched or not; and
   updating a signature result of the web content in the database.

2. The method of claim 1, further comprising:
   querying to a user whether to block the web content; and
   allowing or blocking the web content based on the user's response.

3. The method of claim 1, wherein the security module is installed for each web site of an individual host device through the browser plugin, and each security module installed on the individual host device manages a database for a browser cache corresponding to the web site.

4. The method of claim 1, wherein the web content includes at least one of an execution file, an E-mail, a multimedia file, an image file or other file of the web site.

5. A non-transitory computer-readable recording medium having a program recorded thereon, which, when executed by a computer, implements the method of claim 1.

6. A system for real-time malware detection based on web browser plugin comprising:
   a browser module configured to connect a web server of a web site and execute a security module through a browser plugin of the web site;
   a cache configured to store cache data of a web content of the web site cached from the web server;
   a database for a browser cache of the web site configured to update from the web server by the security module; and
   a security module configured to match the cache data of the web content with the database and warn about the web content if data matched with the cache data of the web content does not exist,
   wherein the security module matches the cache data of the web content with the database, whenever an information transmission is requested to the web server by a user,
   wherein the security module searches data corresponding to the cache data of the web content in the database, determines whether a signature of the cache data is matched with a signature of the data corresponding to the cache data, determines a pass or fail for the signature of the web content based on whether the signature is matched or not, and updates a signature result of the web content in the database, thereby matching the cache data of the web content with the database,
   wherein the browser module installs the security module through the browser plugin if the security module for the web site is not installed on a host device, and the security module downloads the database from the web server, and
   wherein the database includes a file name, a file type, an upload time, a file size, a file author, an IP address and a signature for each of web content of web site according to an ID of the web site.

7. The system for real-time malware detection of claim 6, wherein the security module queries to a user whether to block the web content and based on the user's response, allows or blocks the web content.

8. The system for real-time malware detection of claim 6, wherein the security module is installed for each web site of an individual host device through the browser plugin, and each security module installed on the individual host device manages a database for a browser cache corresponding to the web site.

9. The system for real-time malware detection of claim 6, wherein the web content includes at least one of an execution file, an E-mail, a multimedia file, an image file or other file of the web site.

\* \* \* \* \*